F. G. DAWSON.
SPRING WHEEL.
APPLICATION FILED OCT. 8, 1917.
1,271,138.
Patented July 2, 1918.
2 SHEETS—SHEET 2.
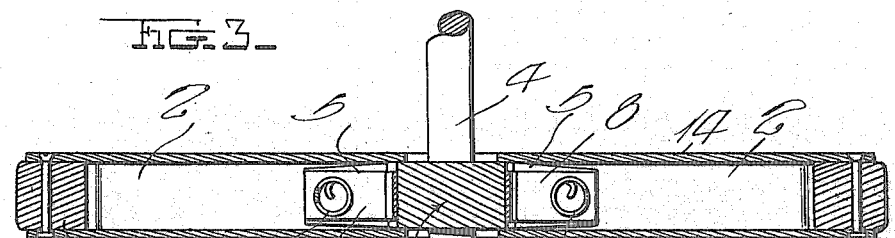
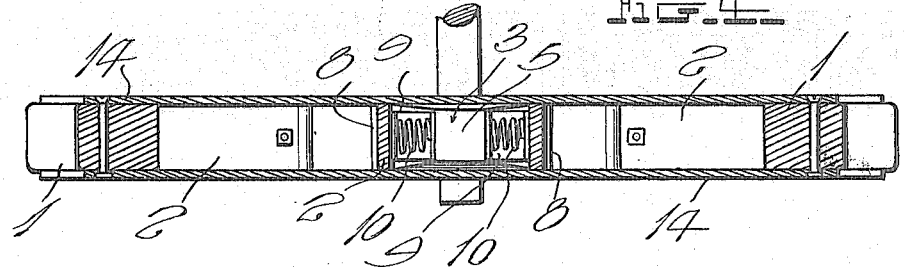
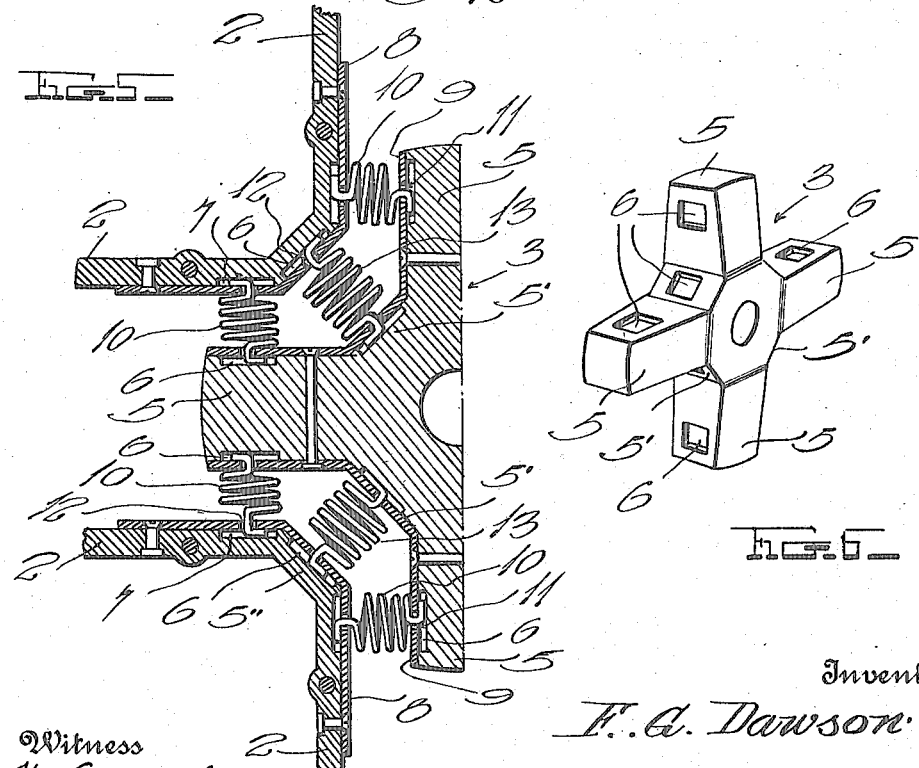
Inventor
F. G. Dawson
Witness
H. Woodard
By
Attorneys

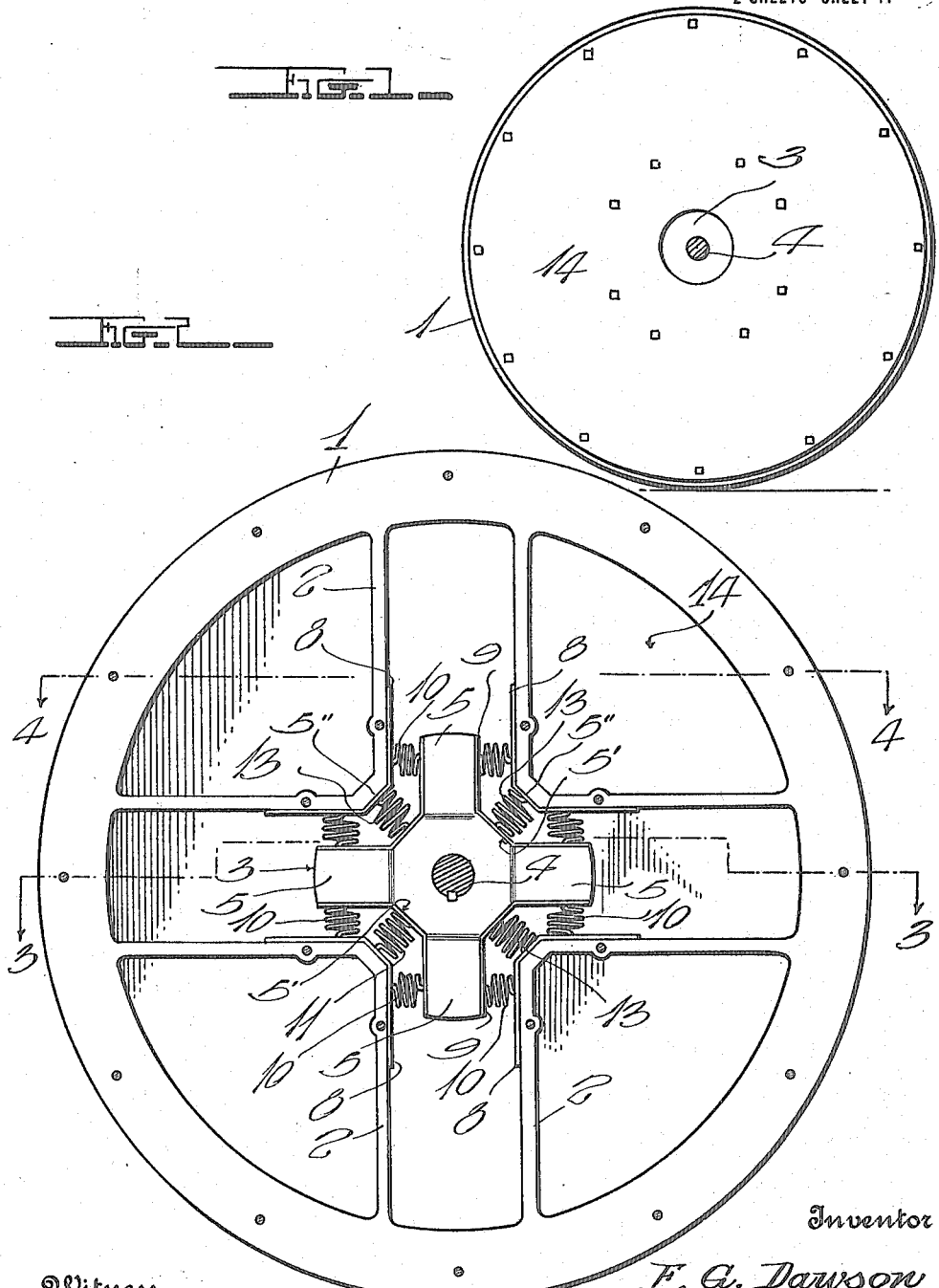

UNITED STATES PATENT OFFICE.

FRANK G. DAWSON, OF SCOTTSVILLE, VIRGINIA.

SPRING-WHEEL.

1,271,138.

Specification of Letters Patent.

Patented July 2, 1918.

Application filed October 8, 1917. Serial No. 195,370.

*To all whom it may concern:*

Be it known that I, FRANK G. DAWSON, a citizen of the United States, residing at Scottsville, in the county of Albemarle and State of Virginia, have invented certain new and useful Improvements in Spring-Wheels; and do declare the following to be a full, clear, and exact description of the invention, such as will enable others skilled in the art to which it appertains to make and use the same.

This invention relates generally to a wheel construction, and more particularly to certain new and useful improvements in spring wheels.

The primary object of the invention is to provide a wheel construction with which it is not necessary to use the outer pneumatic or other cushion tires, the wheel being provided with certain internally disposed springs which serve to absorb practically all of the shocks and jars to which wheels are subjected.

Another object of the invention is to provide a wheel having internally disposed cushioning means and side plates of sufficient strength to preclude the possibility of giving away under stress of end thrust of the vehicle axle in turning sharp curves or sudden jolts in that direction. This feature overcomes the disadvantages found in cushion or spring wheels now known.

A still further object of the invention is to generally improve upon devices of this class by the provision of a comparatively simple, strong, durable and inexpensive construction, one which will be efficient and reliable in operation, and well adapted to the purpose for which it is designed.

With these and numerous other objects in view the invention consists of certain novel features of construction, and the combination and arrangement of parts as will be hereinafter fully described and claimed.

In the accompanying drawings forming a part of the application and in which similar reference characters designate like parts throughout the several views:—

Figure 1 is a side elevation of a device, constructed in accordance with this invention;

Fig. 2 is a side elevation of the wheel taken on an enlarged scale, one of the side or cover plates being removed to show the internal construction of the wheel, and the bolts for holding the cover plate to the body of the wheel being shown in section;

Fig. 3 is a sectional view of the wheel taken substantially on the line 3—3 of Fig. 2;

Fig. 4 is a similar view taken on the line 4—4 of Fig. 2;

Fig. 5 is an enlarged sectional view of a portion of the wheel; and

Fig. 6 is a perspective view of the hub.

Referring more particularly to the drawings, the numeral 1 designates a rim which is preferably made of metal and which may serve as the tire of the wheel. Positioned integrally with or otherwise rigidly fastened to the rim 1 and extending inwardly from the inner side of the same is a plurality of spokes 2. These spokes 2 are arranged in alined pairs, the spokes of each pair being disposed in spaced parallel relation, and the spokes of one pair being integrally united with the adjacent spokes of the adjacent pair as clearly shown by Fig. 2. This construction provides a suitable open framework or body having an axial cross shaped recess therein for proper coöperation with the hub and mounting therefor.

The hub of the wheel is designated by the reference numeral 3 and is provided with a central opening through which extends an axle or spindle 4, it being understood that said opening is constructed to fit whatever make of machine the wheel is intended for. Extending radially from the hub 3 are arms 5, the sides of which converge slightly from their inner to their outer ends for a purpose to be hereinafter explained. The adjacent arms 5 are arranged at right angles to each other so that the hub member is substantially cross shaped in configuration to adapt it to fit into the axial cross shaped recess of the framework of the wheel.

The portions 5' of the hub member 3 which are disposed between the inner ends of the arms 5 are arranged at angles of about 45° to the adjacent sides of the arms, and the portions 5" by which the inner ends of the adjacent spokes of the adjacent pairs are connected are also arranged at angles of about 45° to these spokes. The opposite sides of the arms 5 and the portions 5' of the hub 3 are recessed as at 6, while the adjacent sides of the spokes 2 and 3 and portions 5" are provided with recesses 7, the latter being arranged opposite the recesses 6.

The reference numerals 8 designate plates which are bolted or otherwise suitably secured around the corners formed by the adjacent spokes 2. These plates 8 are suitably shaped so as to fit flat against one of the sides of the spokes and the angularly arranged portions 5'' which unite their inner ends. The hub 3 is provided with similarly constructed plates 9, the latter fitting flat against the sides of the arms 5 and being constructed so as to also fit flat against the portions 5' of the hub. These plates 9 are bolted or otherwise suitably secured to the arms.

Arranged between the arms 5 and the adjacent spokes 2 are sets of oppositely extending coil springs 10, one of the ends of which extend through openings 11 in the plates 9 and bear against the bottoms of the recesses 6, while their other ends extend through openings 12 in the plates 8 and bear against the bottoms of the recesses 7. The adjacent sets of coil springs extend at right angles to each other as clearly shown in Fig. 2 of the drawings.

Disposed between the adjacent sets of coil springs 10 and between the above mentioned portions 5' of the hub and the portions 5'' of the spokes are radially extending coil springs 13. These springs 13 have one of their ends extending through openings arranged in the plates 9 and bear against the bottoms of the recesses 6 in the portions 5' of the hub, while their other ends extend through openings arranged in the plates 8 and bear against the bottoms of the recesses 7 arranged in the portions 5'' which unite the inner end of the spokes 2. This construction provides a rather simple and effective means for anchoring the ends of the coil springs 10 and 11 to the hub and frame work of the wheel.

Bolted to the sides of the wheel are side or cover plates 14, the latter having central openings therein to permit the axle or spindle to project therethrough. In view of the fact that the arms 5 have their inner and outer sides converging from their inner to their outer end, they will not rub against the side plates 15 a great amount, and hence there is little friction between the cushion mounted hub member and said plates. The plates 15 are of sheet metal of sufficient strength to preclude the possibility of them giving away or bulging under stress of ends thrust of the vehicle axle in turning sharp curves or upon being subjected to sudden jolts in that direction. It is believed that this will overcome to a great extent the disadvantages in the forms of spring wheels now known.

From the foregoing description, taken in connection with the accompanying drawings, the construction, use and operation of the device will be readily understood without a more extended explanation. It will be seen that a pneumatic or cushion tire is unnecessary as the hub of the wheel is yieldably and resiliently maintained axially in place in the framework of the wheel by means of the coil springs 10 and 13. These coil springs extending in a great many directions will absorb all of the shock and the jar from the hub and consequently the other mechanism of the vehicle with which the wheel is to be used.

It is obvious that various changes in form, proportion and in the minor details of construction may be resorted to without departing from the spirit of this invention, and hence I do not wish to be limited to the construction herein shown and described other than as claimed.

I claim:—

A spring wheel comprising a wheel body having a cross shaped axial recess therein, the portions of said body at the junction of the adjacent walls of the adjacent radial portions of said recess being disposed angularly to said radial portions of said recess, plates secured to said body and disposed around the corners formed by the adjacent walls of the adjacent radial portions of said recess, said plates fitting flat against the walls of the radial portions of said recess and the above mentioned angularly arranged portions of said body, a hub disposed axially in said recess and having arms extending radially therefrom and disposed in said radial portions of said recess, the portions of said hub disposed between the inner ends of said arms being arranged angularly to the adjacent sides of the latter, additional plates secured to said hub and fitting flat against the sides of said arms and the angularly arranged portions of said hub disposed between said arms, sets of oppositely extending coil springs disposed between the opposite sides of said arms and the adjacent walls of said recess, one of the ends of said springs being secured to the first mentioned plates and their outer ends being secured to the last mentioned plates, and radially extending coil springs disposed between the portions of said hub between said arms and the angular portions of said recess between its radially extending portions, one of the ends of said radially extending springs being secured to the first mentioned plates and their other ends being secured to the last mentioned plates.

In testimony whereof I have hereunto set my hand in the presence of two subscribing witnesses.

FRANK G. DAWSON.

Witnesses:
JACKSON BEAL,
JOS. R. BLAIR.